United States Patent [19]

Kanna et al.

[11] Patent Number: 5,703,768
[45] Date of Patent: Dec. 30, 1997

[54] MOTOR CONTROL APPARATUS

[75] Inventors: Shigeo Kanna; Akihito Uetake, both of Suwa, Japan

[73] Assignee: Seikon Epson Corporation, Tokyo

[21] Appl. No.: 620,585

[22] Filed: Mar. 22, 1996

[30]     Foreign Application Priority Data

Mar. 24, 1995  [JP]  Japan .................... 7-066585
Dec. 25, 1995  [JP]  Japan .................... 7-337387

[51] Int. Cl.$^6$ .................... H02M 3/24; H02M 1/12
[52] U.S. Cl. .................... 363/98; 363/41
[58] Field of Search .................... 363/17, 41, 98, 363/132; 318/801, 805

[56]             References Cited

U.S. PATENT DOCUMENTS

| 4,597,037 | 6/1986 | Okado .................... | 363/98 |
| 5,450,306 | 9/1995 | Garces et al. .................... | 363/41 |
| 5,537,307 | 7/1996 | Hirose et al. .................... | 363/98 |

FOREIGN PATENT DOCUMENTS 40 09 184  9/1991  Germany .
A-06 284517  10/1994  Japan .
2 243 505  10/1991  United Kingdom .

OTHER PUBLICATIONS

IECON'84, 22–26 Oct. 1984, Tokyo, JP, pp. 587–592, XP002002982,M. Ishii et al., "AC-input Brushless DC Motor without Smoothing Capacitor".

*Primary Examiner*—Matthew V. Nguyen
*Attorney, Agent, or Firm*—Eric B. Janofsky

[57]             ABSTRACT

A motor control apparatus is provided which is capable of preventing large, accidental switching surges and suppressing switching surges that hamper efforts to improve the efficiency of PWM control inverters. The motor control apparatus has a PWM control inverter and axial position detector 3 that detects the position of the rotary axis of motor 14. Gate drive circuit 1 of the PWM control inverter comprises decoder circuit 4, correction gate circuit 5, and logical AND circuit 6. The correction gate circuit 5 sets a time difference at the change point for PWM signals and at the change point for commutation signals.

35 Claims, 8 Drawing Sheets

MOTOR CONTROL APPARATUS

BACKGROUND OF THE INVENTION

1. Field of the Invention

The present invention relates generally to a motor control apparatus. More particularly, the present invention relates to a motor control apparatus which suppresses any switching surges from pulse wave modulated or PWM control inverters.

2. Description of the Related Art

In recent years, PWM control inverters have come into wide use for driving or controlling motors. In such PWM control inverters, typically power transistors, MOSFET, IGBT (hereinafter referred to as power devices) are used as control devices.

Figure 16:
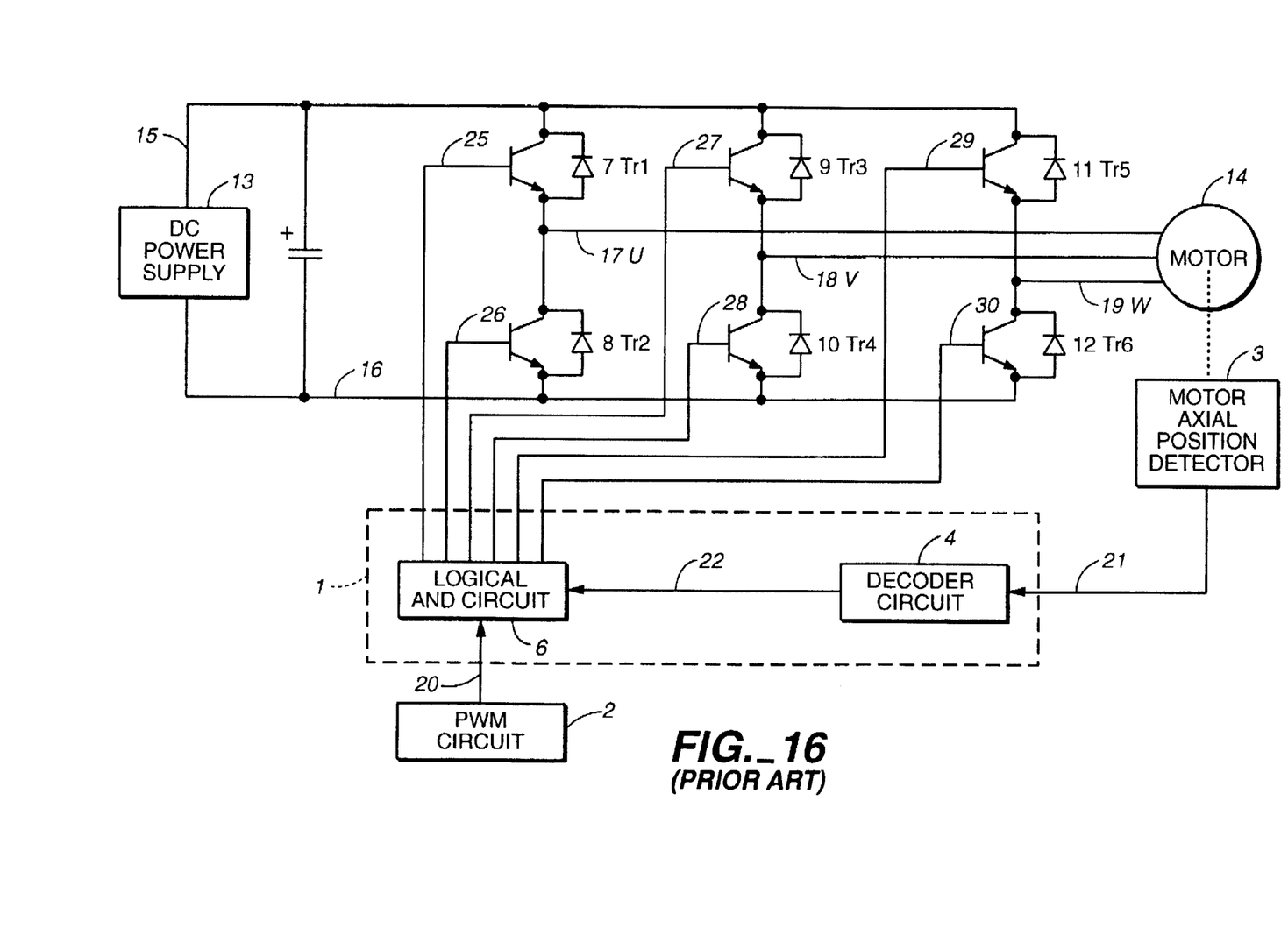
FIG. 16 is a block diagram that shows a conventional motor control apparatus.

FIG. 16 is a block diagram that shows a conventional motor control apparatus having a PWM control inverter circuit. As shown in the figure, motor control apparatus PWM circuit 2 transmits PWM signal 20, in which a pulse width is controlled so that a specified current flows, to gate drive circuit 1 of the inverter. Decoder circuit 4 transmits commutation signal 22 to logical AND circuit 6, based upon detection signal 21 that is transmitted by axial position detector 3 of motor 14. Logical AND circuit 6 enables the corresponding power devices Tr1, Tr2, Tr3, Tr4, Tr5, and Tr6 in accordance with PWM signal 20 and commutation signal 22. As a result of this arrangement motor 14 is driven.

The conventional inverter circuit is arranged as follows. Diodes 7, 8, 9, 10, 11, and 12 are connected to power devices Tr1, Tr2, Tr3, Tr4, Tr5, and Tr6, respectively. Direct current power supply 13 is connected to the input side of the inverter to positive bus 15 and negative bus 16.

In the inverter for the aforementioned conventional motor control apparatus, when the aforementioned power device is switched, a switching surge $\Delta V = L \cdot dI/dt$ is generated, where L denotes the wire inductance, and I denotes the current that flows between positive bus 15 and negative bus 16. In that case, the switching surge can exceed the voltage tolerance of the power device. This can result in damaging any of the components of the inverter. Therefore, conventionally the aforementioned switching surge is suppressed by reducing the aforementioned wire inductance, and by providing a snubber circuit that absorbs $\Delta V$ into the phases of the aforementioned inverter, such as described in Japanese Patent Document H6-284517.

In the prior art as described above, the efficiency of the aforementioned inverter can be increased by increasing the aforementioned switching speed and by reducing the switching loss of the aforementioned power device. However, this increases the dI/dt, thus resulting in an increase in the aforementioned switching surge $\Delta V$. This requires that the power device be a highly voltage-tolerant device. However, the higher the voltage tolerance of the power device, the greater is the attendant loss. Thus, even if the switching speed is increased, the requirement for highly voltage-tolerant power devices defeats the purpose.

Conventional techniques employed to circumvent this problem include reducing the magnitude of the wire inductance and providing a snubber circuit, as stated above. However, these techniques are subject to the limitations of the inverter's size and physical shape.

Furthermore, the switching surge can increase accidentally, especially when the switching by PWM signal 20 and the switching by commutation signal 22 overlap in the power device. It is difficult to reduce the voltage tolerance of the power device in order to prevent damage to the power device from an accidental switching surge.

Thus, there was the problem of the difficulty of increasing the efficiency of the inverter due to switching surges, especially due to large switching surges that occur accidentally.

OBJECTS OF THE INVENTION

Therefore, it is an object of the present invention to overcome the aforementioned problems.

It is another object of the present invention is to provide a highly efficient motor control apparatus.

SUMMARY OF THE INVENTION

In accordance with an aspect of the present invention, motor control apparatus is provided for controlling an operation of a motor by means of a PWM control inverter. The motor control apparatus is provided with a correction means having a function of setting, during motor operation, a time difference at a PWM signal change point and a commutation signal change point.

In accordance with a further aspect of the present invention, the correction means is provided with a function of setting the commutation signal change point into the "off" time of the PWM signal.

In accordance with an additional aspect of the present invention, the correction means corrects at least one of the PWM signals and commutation signals.

In accordance with still another aspect of the present invention, the correction means comprises a commutation signal delay circuit and a PWM signal delay circuit.

In accordance with still a further aspect of the present invention, the commutation signal delay circuit is arranged such that it delays the commutation signal based upon signals from the PWM signal delay circuit and uses signals from the commutation signal delay circuit as commutation signals.

In accordance with still another aspect of the present invention, the correction means comprises a prohibition gate circuit that adjusts the output of PWM signals, and a commutation signal delay circuit.

In accordance with still an additional aspect of the present invention, the prohibition gate circuit is constructed such that it disables, by means of the commutation signals, the output of the PWM signals, and the prohibition gate circuit uses the signals from the commutation signal delay circuit as commutation signals.

In accordance with yet another aspect of the present invention, the correction means comprises a prohibition gate circuit that adjusts the output of PWM signals, a first commutation signal delay circuit that delays commutation signals, and a second commutation signal delay circuit that further delays the commutation signals that are delayed by the first commutation signal delay circuit.

In accordance with yet a further aspect of the present invention, the prohibition gate circuit is constructed such that, by means of the commutation signals, it disables the output of the PWM signals and enables the output of the PWM signals by means of the signals from the second commutation signal delay circuit.

In accordance with yet another aspect of the present invention, the correction means is a control means that is provided with memory that stores a program that sets a time difference at PWM signal change points and commutation signal change points during motor operation, such that the correction means is constructed so that said time differences are set by the execution of said program by the control means.

In accordance with still yet an additional aspect of the present invention, the control means is provided with a function of determining whether the PWM signal is ON or OFF and performs processing based on the result of the determination.

In accordance with still yet a further aspect of the present invention the control means, when the commutation signal is input, turns the PWM signal off if the PWM signal is on; and if the PWM signal is off, enables the output of the PWM signals after the output of the commutation signals is commenced.

In accordance with still yet an additional aspect of the present invention the time difference is 0.5 Tg or greater if the switching time of the power device of the PWM control inverter is defined as Tg.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Reference is now made to accompanying figures.

In general, the motor control apparatus of the present invention controls the operation of a motor by means of a pulse width modulated or PWM control inverter, and comprises a PWM control inverter (an inverter) and an axis position detector that detects the position of the motor's rotary axis.

The aforementioned PWM control inverter comprises a plurality (six in the preferred example) of power devices, a gate drive circuit, and a PWM circuit; it is also provided with a correction means with a function of setting a time difference at PWM signal change points and commutation signal change points. The correction means corrects at least one of the PWM signals and commutation signals by delay, shortening or lengthening the signals.

The following is an explanation of the embodiments of the present invention with reference to drawings. Although in the following embodiments power devices Tr1, Tr2, Tr3, Tr4, Tr5, and Tr6 of the PWM control inverter (inverter) are described as MOSFET devices, the description should not be construed as limiting the power devices Tr1–Tr6 to MOSFET devices. As will be understated by on of ordinary skill in the art, other appropriate switching devices may be employed. In addition to MOSFET, power transistors and IGBTs can be used as power devices Tr1–Tr6.

First Embodiment

Figure 1:
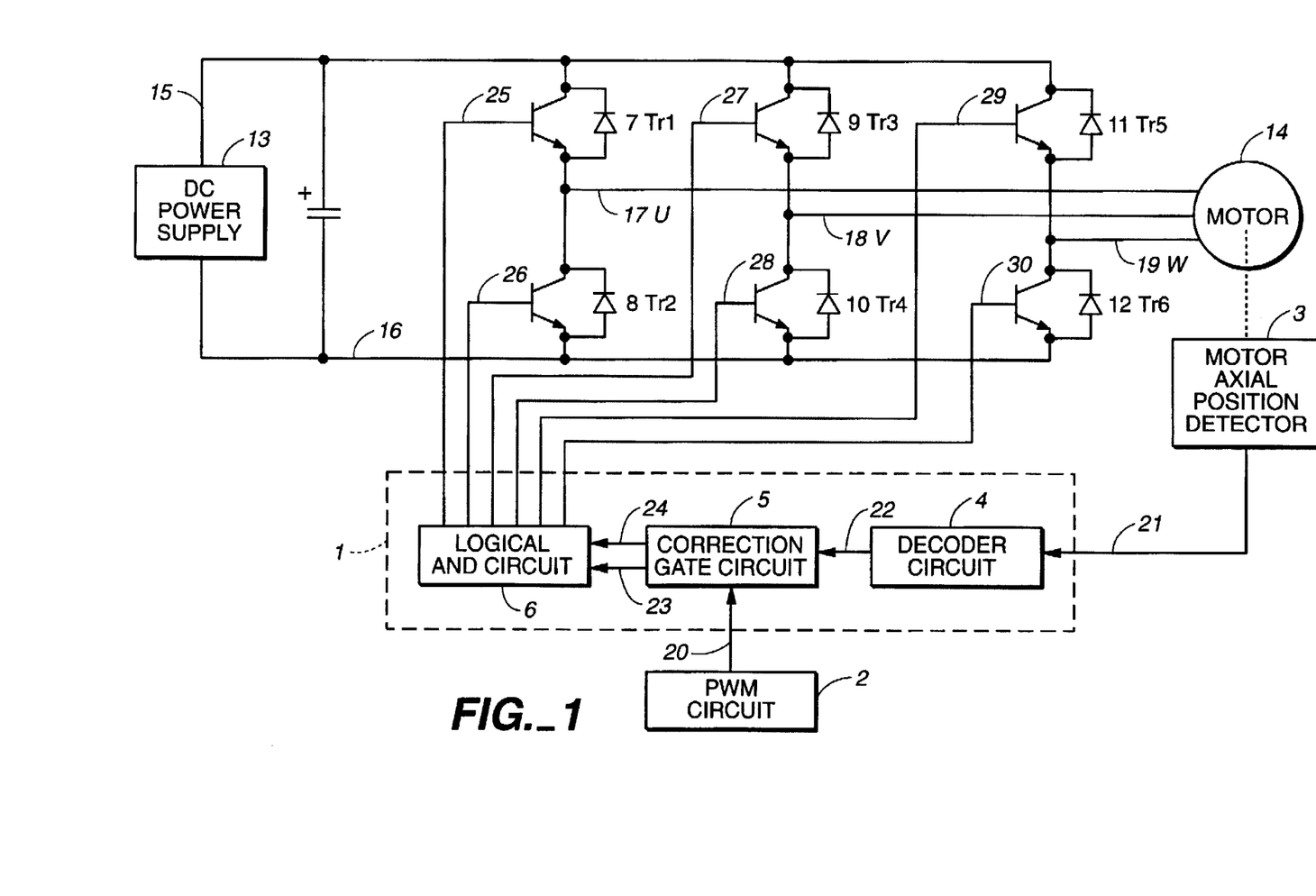
FIG. 1 is a block diagram that depicts an embodiment of the motor control apparatus of the present invention.

FIG. 1 is a block diagram that shows an example configuration of the motor control apparatus of the present invention (the motor-driving PWM control inverter circuit based on the present invention). It should be noted that FIG. 1 corresponds to FIG. 16, in which items that have virtually identical configurations are assigned the same reference numerals and their explanation is omitted.

As shown in FIG. 1, in contrast to the conventional motor control apparatus, this embodiment is provided with correction gate circuit 5 as a correction means with a function of setting, during motor operation, a time difference at change points for the PWM signals and change points for the commutation signals.

Figure 15:
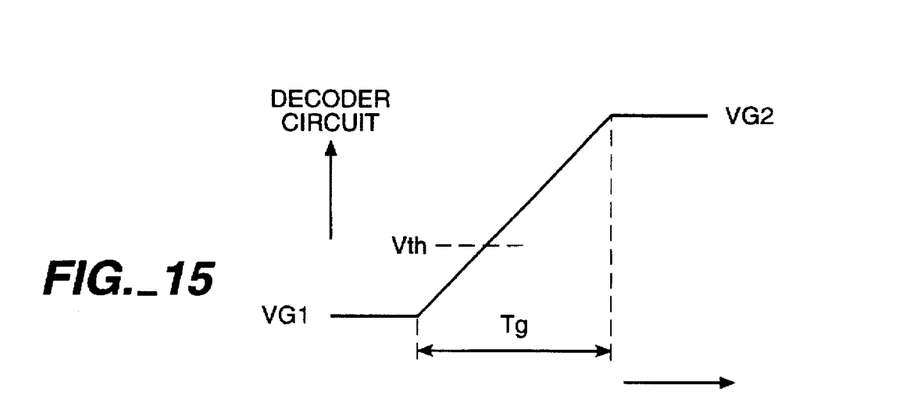
FIG. 15 is a conceptual diagram depiction the gate signal switching of the present invention.

In the context of this document, the gate signal switching time Tg for power devices Tr1–Tr6 during motor operation refers to the time that the gate voltage (the gate-source voltage in the MOSFET) for the power device Tr1–Tr6 changes from VG1 to VG2 through threshold voltage Vth as shown in FIG. 15.

The change point for a PWM signal or a commutation signal, as mentioned above, refers to a point in time when the gate voltage passes through Vth, as shown in FIG. 15.

In the following, the term "gate signal" refers to the aforementioned gate voltage. When the gate voltage of the aforementioned power device is VG2, the gate signal is said to be ON; when the gate voltage is at VG1, the gate signal is said to be OFF.

Figure 2:
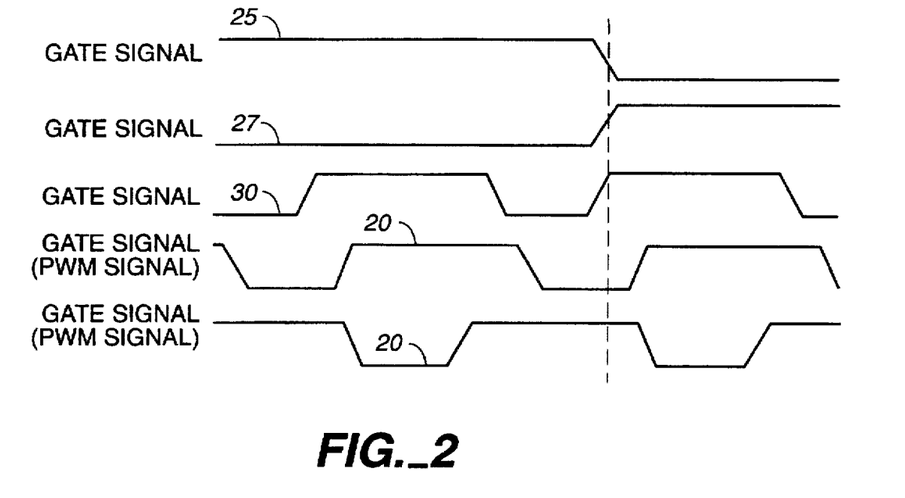
FIG. 2 is a timing chart of the operation of the present invention.

The following is an explanation of the above scheme with reference to the timing chart in FIG. 2. For the sake of simplicity, the discussion below only explains the points in time when the direction of motor current changes from phase U to phase W and from phase V to phase W.

In this case, gate signal 25 of power device Tr1 changes from ON to OFF (FIG. 2, gate signal 27 of power device Tr3 changes from OFF to ON (FIG. 2, and PWM signal 20 is transmitted to control gate signal 30 of power device Tr6.

The switching surge mentioned above is proportional to both wire inductance L of bus or cable 16 and the quantity dI/dt. The quantity dI/dt is generated by the switching of power devices Tr1–Tr6. The larger the number of power devices that are switched, the greater is the quantity dI/dt. Thus, when gate signal 30 of power device Tr3 as shown in FIG. 2 is positioned at the change point for the commutation signal and that for the PWM signal coincide, as indicated by the vertical dashed line, the magnitude of dI/dt is increased. In conventional PWM control inverters, this phenomenon occurs accidentally and accidentally increases the switching surge.

Therefore, a time difference is provided at the change point for PWM signal 20 and that for the commutation signal 22 so that gate signal 30 of power device Tr6 will occur as shown in FIG. 2. This prevents the large, accidental switching surges that are described above.

Second Embodiment

As noted above, FIG. 1 is a block diagram that shows an example configuration of the motor control apparatus of the present invention (the motor-driving PWM control inverter circuit based on the present invention). It should be noted that FIG. 1 corresponds to FIG. 16, in which items that have virtually identical configurations are assigned the same codes and their explanation is omitted.

As shown in the FIG. 1, in contrast to the conventional motor control apparatus, this embodiment is provided with correction gate circuit 5 with a function of setting a time difference at the change point for a PWM signal and that for a commutation signal during motor operation, as well as a function of turning the change point for the PWM signals as OFF time.

Figure 3:
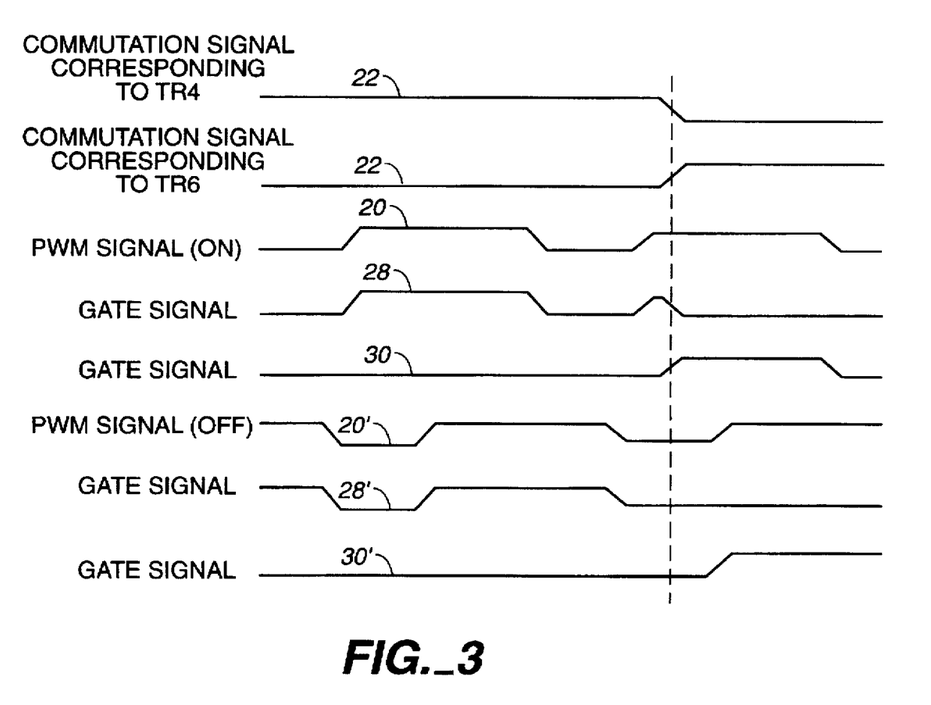
FIG. 3 is a timing chart of the operation of a first embodiment of the present invention.

The following is an explanation of the appropriateness of the above scheme with reference to the timing chart of FIG. 3. For the sake of simplicity, the discussion below only explains the points in time when the direction of motor current changes from phase U to phase V and from phase U to phase W.

In this case, power device Tr1 remains ON, and the power device to which PWM signal 20 is transmitted changes from power device Tr4 to power device Tr6. If commutation signal 22 corresponding to power device Tr4 is transmitted as in FIG. 3, and commutation signal 22 corresponding to power device Tr6 is transmitted as in FIG. 3, when PWM signal 20 that is transmitted from PWM circuit 2 is ON FIG. 3, the gate signals of power devices Tr4 and Tr6 assume the states shown in FIG. 3. This causes power devices Tr4 and Tr6 to undergo switching.

However, if the PWM signal 20 is OFF as shown in FIG. 3, gate signals 28 and 30 are generated for power devices Tr4 and Tr6 during commutation assume the states. In this case, power devices Tr4 and Tr6 will not switch.

Therefore, a time difference is set at the change point for the PWM signal and at that for the commutation signal, and the change point for the commutation signal is defined as the time when the PWM signal is OFF. This prevents any large accidental switching surges as described above. In particular, if power devices Tr1, Tr3, and Tr5 are constructed as the upper portion, and power devices Tr2, Tr4, and Tr6 as the lower portion, the greater the purges of switching of the lower portion compared to the switching of the upper portion, as described in the first embodiment, the greater is the effect of the present invention, as illustrated by the present embodiment.

Figure 4:
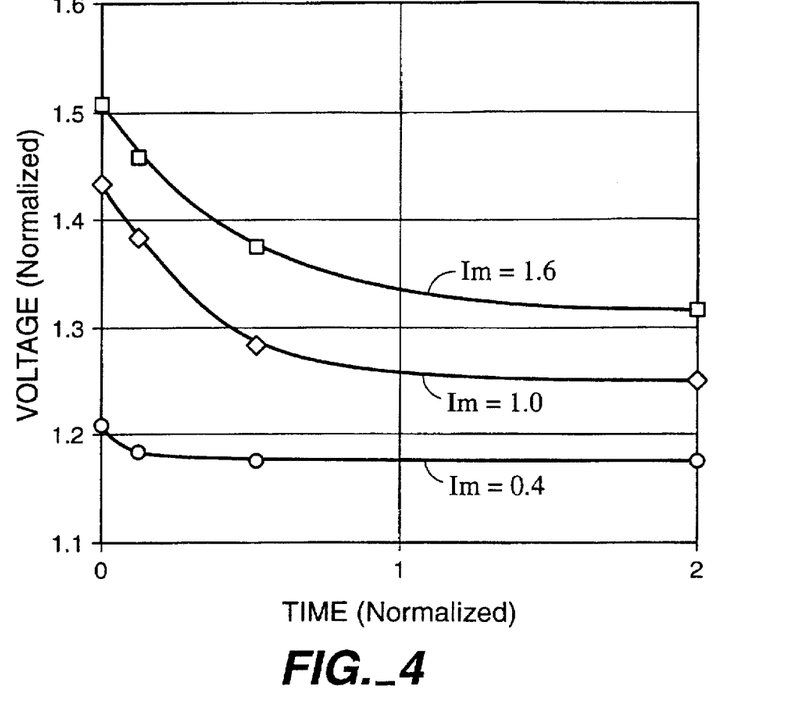
FIG. 4 is a family of curves of the normalized voltage vs. time as the current parameter invention Im is varied.

FIG. 4 shows on example of actual measurements based upon the present embodiment. The horizontal axis of the graph shown in FIG. 4 depicts the time difference at the change point for the PWM signal and that for the commutation signal (also simply referred to as the "time difference"), normalized by the gate signal switching time Tg. The vertical axis plots the maximum voltage that appears at positive bus 15 and negative bus 16, normalized by the DC power supply voltage. The motor current Im is normalized by the motor current that is required for rated motor output.

As illustrated in the figure, the switching surge can be suppressed by setting the aforementioned time difference at 0.5 Tg or greater, preferably at 0.8 Tg or greater, and optimally at 1.0 Tg or greater.

As described above, the aforementioned large, accidental switching surges can be prevented and switching surges can be inhibited by setting a time difference at the change point for the PWM signal and that for the commutation signal, and by setting the change point for the commutation signal to the time when the PWM signal is OFF.

Third Embodiment

Figure 5:
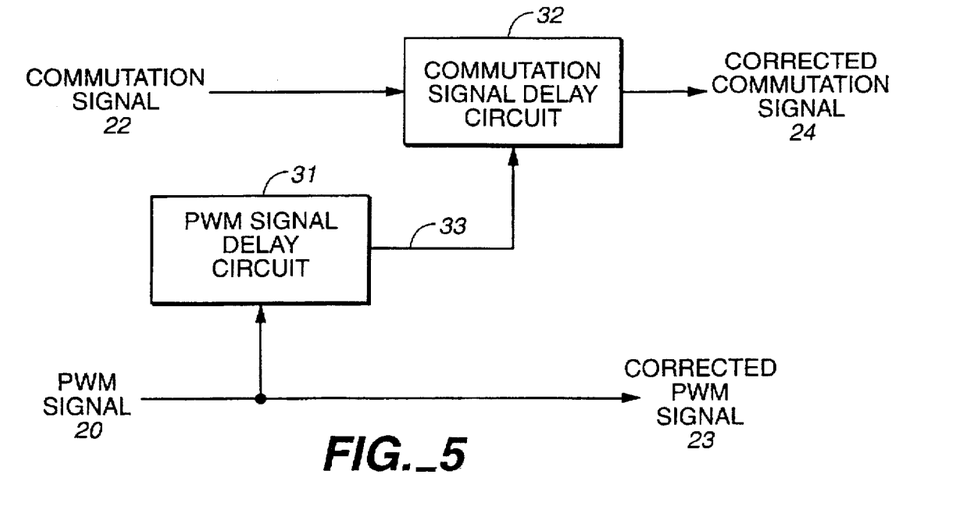
FIG. 5 is a block diagram that illustrating the first embodiment a correction gate circuit of the present invention.
Figure 6:
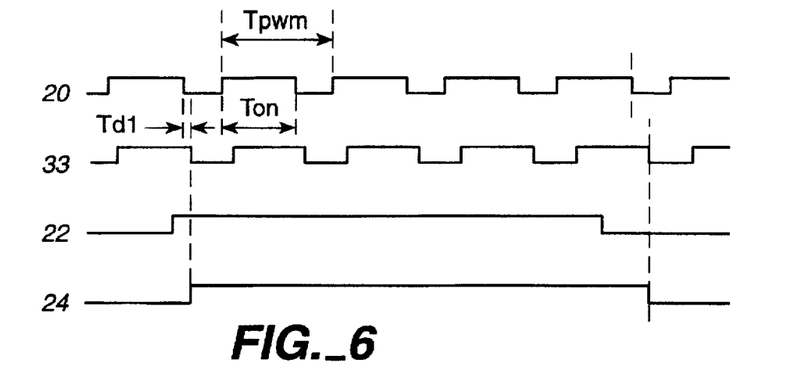
FIG. 6 is a timing chart illustrating the signals in a correction gate circuit of FIG. 5 when the commutation signal changes from a low level to a high level when the PWM signal is enabled.
Figure 7:
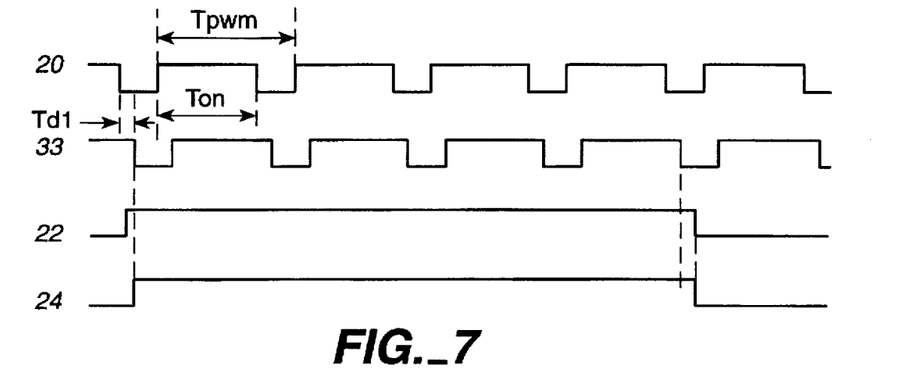
FIG. 7 is a timing chart illustrating the signals in the correction gate circuit of FIG. 5 when the commutation signal changes from the low level to the high level when the PWM signal is disabled.

FIG. 5 is a block diagram that shows an exemplary configuration of correction gate circuit 5 in the motor control apparatus of the present invention. FIG. 6 is a timing chart that shows the signals in correction gate circuit 5, shown in FIG. 5, when commutation signal 22 changes from the low level (synonymous with the signal being OFF) to the high level (synonymous with the signal being ON) when PWM signal 20 is ON. Similarly, FIG. 7 is a timing chart that shows the signals in correction gate circuit 5, shown in FIG. 5, when commutation signal 22 changes from the low level to the high level when PWM signal 20 is OFF. The following explanation is based on FIGS. 5, 6 and 7.

Correction gate circuit 5 in this embodiment is provided with a function of setting a time difference, during motor operation, at the change point for PWM signals and at the change point for commutation signals, as well as a function of setting the change point for the commutation signal at the time when a PWM signal is OFF.

Specifically, as shown in FIG. 5, correction gate circuit 5 comprises PWM signal delay circuit 31, which delays PWM signal 20, and commutation signal delay circuit 32, which delays commutation signal 22, based on the signals from PWM signal delay circuit 31. In this case, the signals from commutation signal delay circuit 32, namely corrected commutation signal 24, are used as commutation signals.

First, the following is an explanation in which commutation signal 22 changes from the low level (synonymous with the signal being OFF) to the high level (synonymous with the signal being ON) when PWM signal 20 is ON.

As shown in FIGS. 5 and 6, the PWM signal 20 that is transmitted from PWM circuit 2 is delayed by time Td1 (Td1>0.5 Tg) and by PWM signal delay circuit 31 and is output as delayed PWM signal 33. These signals are shown in the timing chart of FIG. 6.

This delayed PWM signal 33 is used as a clock signal, and commutation signal 22 is converted into corrected commutation signal 24 by commutation signal delay circuit 32 (FIG. 6). It should be noted that, in this embodiment, only commutation signals are corrected.

By the transmission of this corrected commutation signal 24 and PWM signal 23, which is the same as PWM signal 20, to logical AND circuit 6 of FIG. 1, the aforementioned accidental large switching surges can be prevented and switching surges can be suppressed when the motor operates by satisfying the condition $0<T_{on}<T_{pwm}-0.5\ T_g-T_{d1}$, given the fact that if the PWM signal cycle is denoted as $T_{pwm}$ and the PWM signal ON time as $T_{on}$, the time difference described in embodiment 2 is greater than or equal to 0.5 Tg.

The following is an explanation of the case where commutation signal 22 changes from the low level to the high level when PWM signal 20 is OFF.

As shown in FIGS. 5 and 7, as commutation signal 22 changes from the low level to the high level when aforementioned PWM signal 20 was ON, PWM signal 20 that is transmitted from PWM circuit 2 is also delayed by time $T_{d1}$ by PWM signal delay circuit 31 and becomes delayed PWM signal 33 as shown in FIG. 7.

This delayed PWM signal 33 is used as a clock signal, and commutation signal 22 is converted into corrected commutation signal 24 by commutation signal delay circuit 32 (FIG. 7). It should be noted that, in this embodiment, only commutation signals are corrected.

Both corrected commutation signal 24 and corrected PWM signal 23, which is the same as commutation signal 20, are transmitted to logical AND circuit 6 of FIG. 1.

In this embodiment, corrected commutation signal 24 changes from the high level to the low level when both delayed PWM signal 33 and commutation signal 22 are at the low level (when they have reached the low level) as shown in FIGS. 6 and 7.

As will be appreciated by one of ordinary still on the art, timers and counters can be used as a means of generating a time delay ($T_{d1}$). Of course, the delay circuits can be implemented by any other appropriate circuits.

In this case, the time delay can be changed by switching the circuits or by setting a count in the counter.

For suppressing the switching surge more reliably, the aforementioned time $T_{d1}$ should be $T_{d1} \geq 0.5\ T_g$, preferably $T_{d1} \geq 0.8\ T_g$, and optimally $T_{d1} \geq T_g$.

To create a time difference greater than or equal to $0.8\ T_g$, the aforementioned PWM signal ON time, $T_{on}$, should be $0<T_{on}<T_{pwm}-0.8T_g-T_{d1}$. To create a time difference greater than or equal to $T_g$, $T_{on}$ should be $0<T_{on}<T_{pwm}-T_g-Td_1$.

Because it only uses delay circuits, this embodiment offers the advantages of a simple circuit configuration and the ability accurately to set specified, aforementioned, time differences.

Fourth Embodiment

Figure 8:
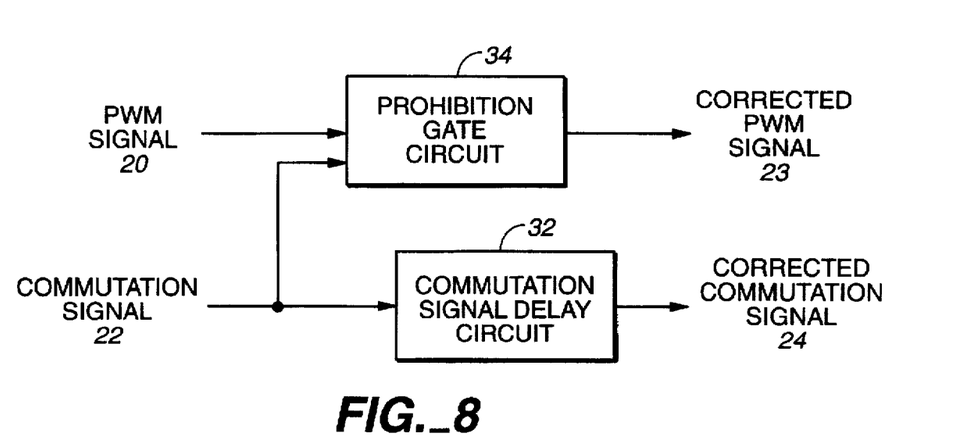
FIG. 8 is a block diagram depicting a second embodiment of the correction gate circuit of the present invention.
Figure 9:
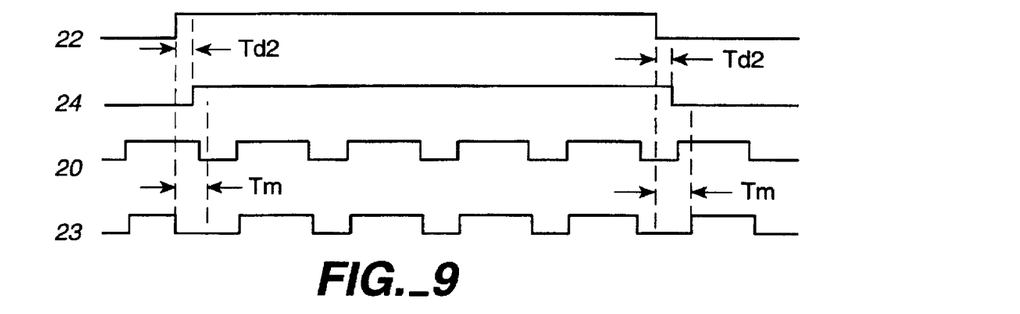
FIG. 9 is a timing chart illustrating the signals in the correction gate circuit of FIG. 8.

FIG. 8 is a block diagram that shows another configuration example of correction gate circuit 5 in the motor control apparatus of the present invention. FIG. 9 is a timing chart that shows the signals in correction gate circuit 5, shown in FIG. 5. The following explanation is based on FIGS. 8 and 9.

Correction gate circuit 5 in this embodiment provides a time difference, during motor operation, at the change point for PWM signals and at the change point for commutation signals, and has the function of setting the change point for the commutation signal at the time when a PWM signal is OFF.

Specifically, as shown in FIG. 8, correction gate circuit 5 comprises prohibition gate circuit 34, which adjusts the output of PWM signal 20, and commutation signal delay circuit 32, which delays commutation signal 22.

In this case, prohibition gate circuit 34 is configured so that it disables the output of PWM signal 20 by means of commutation signal 22. Further, the signal from the prohibition gate circuit 34 namely corrected PWM signal 23 are used as a PWM signals; and the signals from commutation signal delay circuit 32, namely corrected are used as commutation signal 24, as commutation signals.

As shown in FIGS. 8 and 9, commutation signal 22 is delayed by time $T_{d2}$ ($T_{d2} \geq 0.5\ T_g$) by commutation signal delay circuit 32 and becomes delayed and corrected commutation signal 24 (FIG. 9).

The PWM signal 20 transmitted from PWM circuit 2 becomes, after processing by prohibition gate circuit 34, corrected PWM signal 23 that is forced to become an OFF signal, triggered by commutation signal 22, at least during time $T_m$ ($T_m \geq T_{d2}+0.5\ T_g$) from the change point for commutation signal 22, as shown in FIG. 9.

Specifically, as shown in FIG. 9, when commutation signal 22 changes from the low level to the high level when PWM signal 20 is ON, corrected PWM signal 23 is turned OFF by prohibition gate circuit 34 using commutation signal 22 (in this embodiment, the rise of commutation signal 22) as a trigger. Corrected PWM signal 23 remains at the low level until a pulse after PWM signal 20 arrives.

Although not shown in the figure, if PWM signal 20 remains at the high level after the passage of time $T_m$, corrected PWM signal 23 turns ON and reaches the high level.

Further as shown in FIG. 9, if commutation signal 22 changes from the high level to the low level when PWM signal 20 is OFF, corrected PWM signal 23 is changed by prohibition gate circuit 34 to the low level during time $T_m$ from the change point (in this embodiment the fall change point for commutation signal 22) for commutation signal 22 and turns ON after the passage of time $T_m$.

By transmitting corrected PWM signal 23 and corrected commutation signal 24 to logical AND circuit 6, it is possible to prevent the aforementioned accidental large switching surges and to suppress any switching surges.

For suppressing a switching surge more reliably, aforementioned time $T_{d2}$ should be $T_{d2} \geq 0.5\ T_g$, preferably $T_{d2} \geq 0.8\ T_g$, and most optimally $T_{d2} \geq T_g$.

For suppressing a switching surge more reliably, aforementioned time $T_m$ should be $T_m \geq T_{d2}+0.5\ T_g$, preferably $T_m \geq T_{d2}+0.8\ T_g$, and optimally $T_m \geq T_{d2}+T_g$.

This embodiment offers the advantages of a simple circuit configuration, the ability to set a specified time difference accurately, as described above, and of not requiring the aforementioned time Ton condition because the PWM signal is unilaterally turned OFF.

Fifth Embodiment

Figure 10:
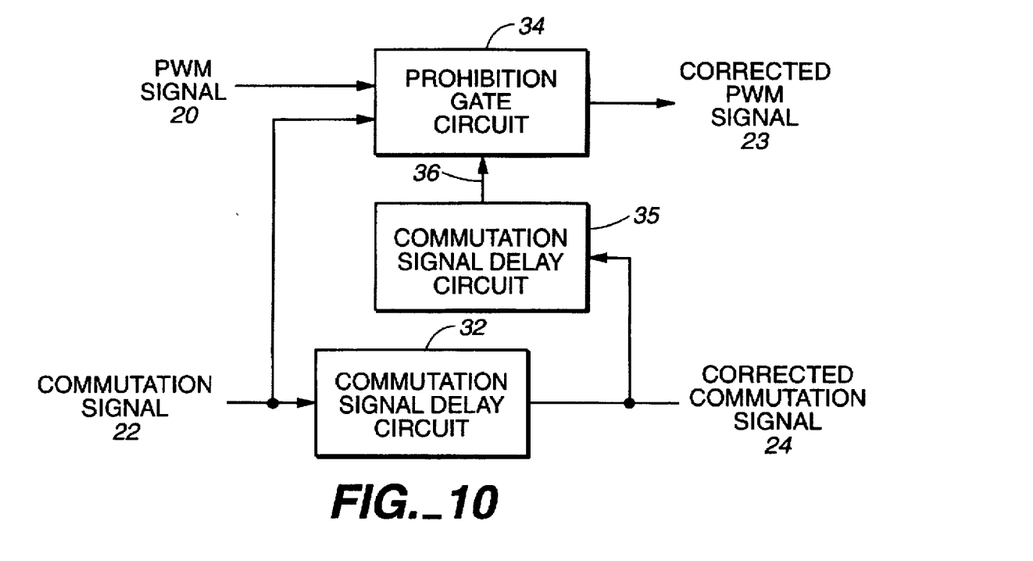
FIG. 10 is a block diagram that shows a third embodiment of the correction gate circuit of the present invention.
Figure 11:
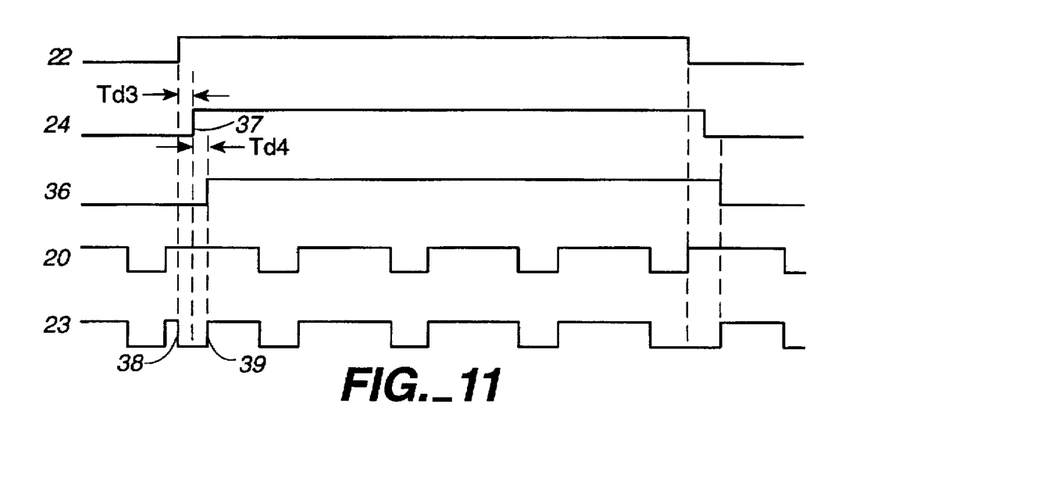
FIG. 11 is a timing chart that shows the signals in the correction gate circuit of FIG. 10 when the commutation signal changes from the low level to the high level when the PWM signal is enabled.
Figure 12:
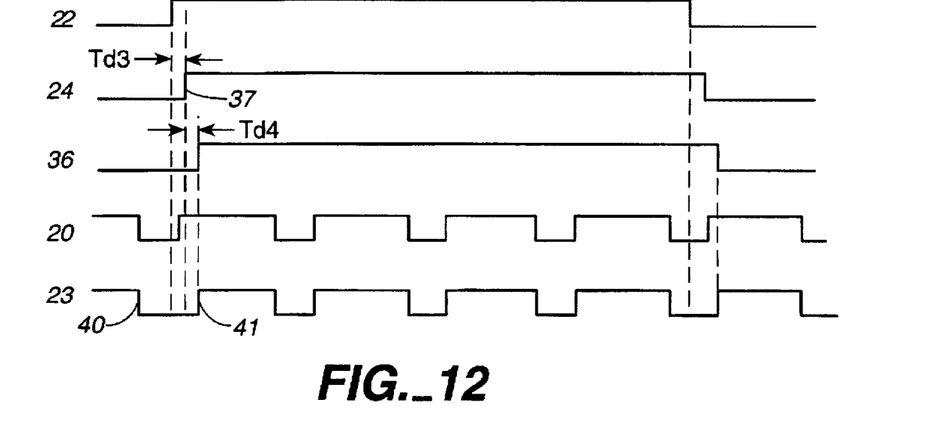
FIG. 12 is a timing chart that shows the signals in the correction gate circuit of FIG. 10 when the commutation signal changes from the low level to the high level when the PWM signal is disabled.

FIG. 10 is a block diagram that shows another configuration example of correction gate circuit 5 in the motor control apparatus of the present invention. FIG. 11 is a timing chart that shows the signals in correction gate circuit 5, shown in FIG. 10, when commutation signal 22 changes from the low level to the high level when PWM signal 20 is ON. FIG. 12 is a timing chart that shows the signals in correction gate circuit 5, shown in FIG. 10, when commutation signal 22 changes from the low level to the high level when PWM signal 20 is OFF. The following explanation is based on FIGS. 10, 11, and 12.

Correction gate circuit 5 in this embodiment is provided with a function of setting a time difference, during motor operation, at the change point for PWM signals and at the change point for commutation signals, as well as a function of setting the change point for the commutation signal at the time when a PWM signal is OFF.

Specifically, as shown in FIG. 10, correction gate circuit 5 comprises prohibition gate circuit 34, which adjusts the output of PWM signal 20 (the output of corrected PWM signal 23), a first commutation signal delay circuit 32 that delays commutation signal 22; and a second commutation signal delay circuit 35 which further delays the commutation signal (corrected commutation signal 24) that was delayed by commutation signal delay circuit 32.

In this case, prohibition gate circuit 34 is configured so that it disables the output of PWM signals by means of commutation signal 22 and enables the output of PWM signal 20 by means of the signals from commutation signal delay circuit 35. Further, the signals from the prohibition gate circuit 34, namely, corrected PWM signal 23 are used as PWM signals; and the signals from commutation signal delay circuit 32, namely, corrected commutation signal 24 are used, as commutation signals.

First, the following describes the case where commutation signal 22 changes from the low level to the high level when PWM signal 20 is ON.

As shown in FIGS. 10 and 11, commutation signal 22, transmitted by decoder circuit 4, is input into prohibition gate circuit 34 as well as into commutation signal delay circuit 32, and emerges as corrected commutation signal 24, which is delayed by time $T_{d3}$ by commutation signal delay circuit 32, as shown in FIG. 11.

The corrected commutation signal 24 is changed by commutation signal delay circuit 35 into a re-delayed signal 36 delayed by time $T_{d4}$ in FIG. 11. Re-delayed signal 36 is input into prohibition gate circuit 34.

The PWM signal 20 transmitted from PWM circuit 2 becomes, in prohibition gate circuit 34, corrected PWM signal 23 that is forced to become an OFF signal, triggered by aforementioned commutation signal 22 and re-delayed signal 36, at least between the change point for commutation signal 22 and the change point for re-delayed signal 36, as shown in FIG. 11.

By transmitting both corrected PWM signal 23 and corrected commutation signal 24 to logical AND circuit 6, it is possible to prevent the aforementioned accidental large switching surges and suppress switching surges.

In the case of the timing shown in FIG. 11, the time difference between change point 37 for corrected commutation signal 24 and change point 38 for corrected PWM signal 23 will be $T_{d3}$; similarly, the time difference between change point 37 for corrected commutation signal 24 and change point 39 for corrected PWM signal 23 will be $T_{d4}$.

Next, the following describes the case where commutation signal 22 changes from the low level to the high level when PWM signal 20 is OFF.

As shown in FIGS. 10 and 12; similar to the case where commutation signal 22 changes from the low level to the high level when PWM signal 20 is ON, as described above, PWM signal 20, transmitted from PWM circuit 2, becomes, in prohibition gate circuit 34, corrected PWM signal 23 that is forced to become an OFF signal, triggered by aforementioned commutation signal 22 and re-delayed signal 36, at least between the change point for commutation signal 22 and the change point for re-delayed signal 36, as shown in FIG. 12. Both corrected PWM signal 23 and corrected commutation signal 24 are transmitted to logical AND circuit 6.

In the case of the timing shown in FIG. 12, the time difference between change point 37 for corrected commutation signal 24 and change point 40 for corrected PWM signal 23 will be greater than or equal to $T_{d3}$, and the time difference between change point 37 for corrected commutation signal 24 and change point 41 for corrected PWM signal 23 will be $T_{d4}$.

Aforementioned time $T_{d3}$ should be $T_{d3} \geq 0.5\,T_g$, preferably $T_{d3} \geq 0.8\,T_g$, and optimally $T_{d3} \geq T_g$. Similarly, time $T_{d4}$ should be $T_{d4} \geq 0.5\,T_g$, preferably $T_{d4} \geq 0.8\,T_g$, and optimally $T_{d4} \geq T_g$. In this case, times $T_{d3}$ and $T_{d4}$ can be either equal or different.

This embodiment offers the advantages of a simple circuit configuration, the ability to set a specified time difference accurately, as described above, and of not requiring the aforementioned time $T_{on}$ condition because the PWM signal is unilaterally turned off.

Because this embodiment is capable of generating corrected PWM signal 23 for which PWM signal 20 is OFF (at the low level) only for the necessary and sufficient interval (period), it offers the advantage of superior PWM commutation.

In the embodiments described above, a time difference is set at the change point for a PWM signal and at the change point for a commutation signal by corrected gate circuit 5. However, in the present invention a control means (not shown in the figure) can be provided as a correction means in place of correction gate circuit 5, and this control means can be used to set a time difference at the change point for a PWM signal and at the change point for a commutation signal.

In this case, for example, in the specified memory (not shown in the figure) that is built into the control means a program can be pre-stored (recorded) to set a time difference at the change point for a PWM signal and at the change point for a commutation signal during motor operation, so that said control means executes the program to control the operation of gate drive circuit 1, PWM circuit 2, and other components, in order to set the aforementioned time difference. Such control means can be a microcomputer. Such memory can be ROM, EEPROM, and similar nonvolatile memory.

Sixth Embodiment

The following is an explanation of the sixth embodiment.

Figure 13:
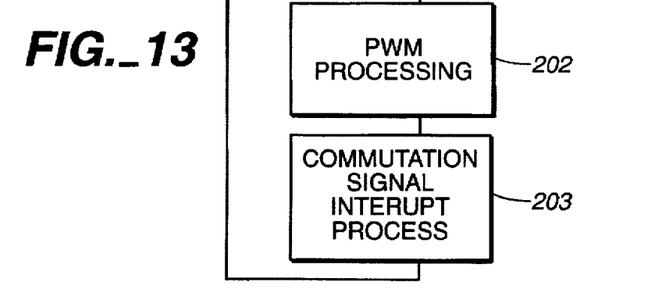
FIG. 13 is the main portion of a flowchart depicting the operation of the control means in the present invention.
Figure 14:
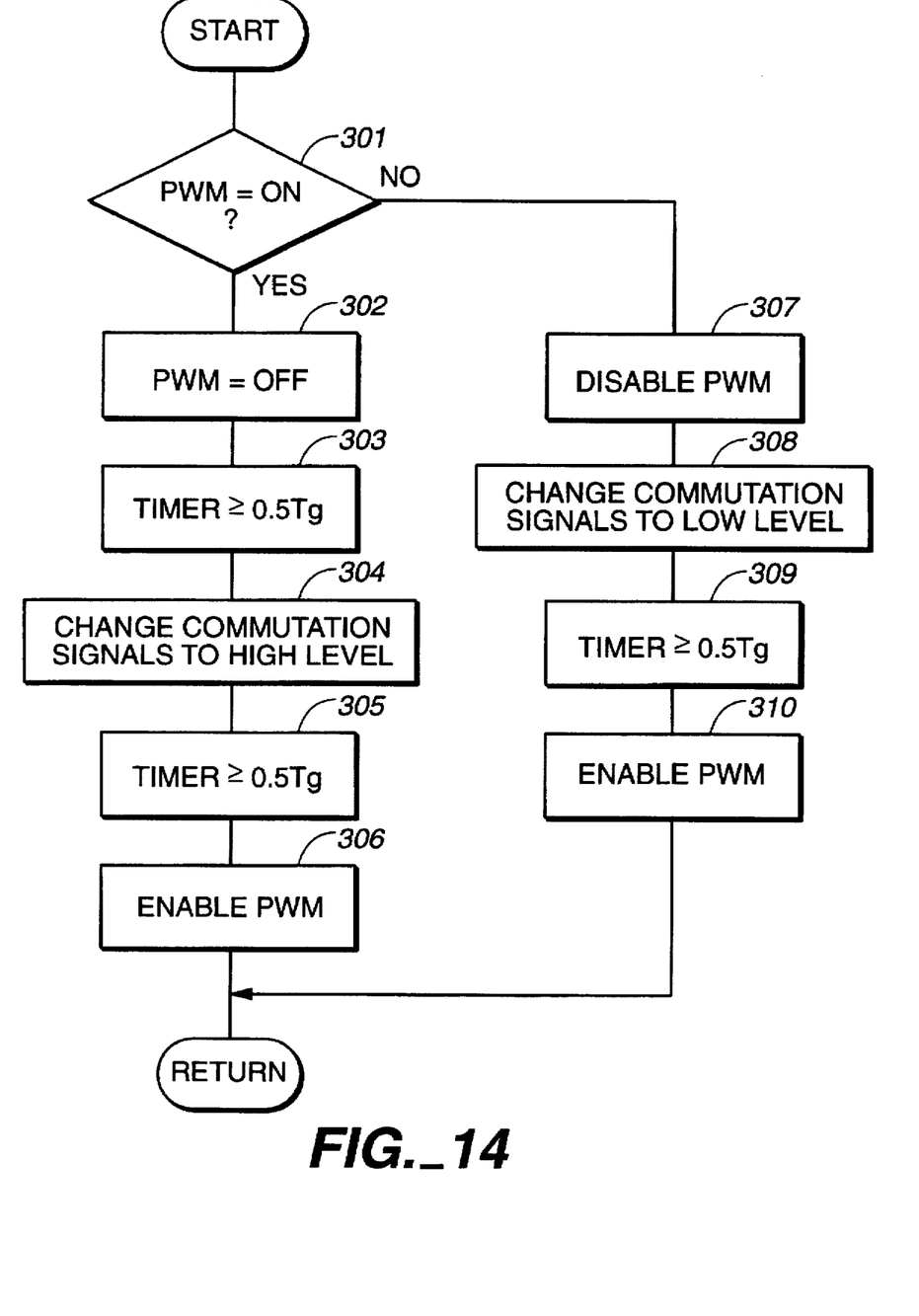
FIG. 14 is a flowchart that shows the subroutine for a controlling means during commutation signal interrupt processing in the present invention.

FIG. 13 is the main part of a flowchart (the main routine) that shows the operation of the control means. FIG. 14 is a flowchart (a subroutine) that shows the operation of the control means when it performs commutation signal interrupt processing. The following explanation is based on these flowcharts.

As shown in FIG. 13, when an instruction voltage associated with the target value for the voltage to be applied to motor 14 is input, a PWM instruction value is read according to the instruction voltage (step 201).

Subsequently, PWM processing (a PWM subroutine) is executed (step 202). The PWM processing replaces the PWM instruction value with PWM data, reads the PWM data after replacement, outputs a PWM signal with a specified time ratio based on the PWM data that is read out, and then returns to the main routine.

After the above step, the commutation signal interrupt processing is enabled (step 203). Although not shown in the flowchart of FIG. 13, the commutation signal interrupt processing is disabled in specified steps following step 203.

The commutation signal interrupt processing is executed when a commutation signal interrupt instruction is input when the aforementioned commutation signal interrupt processing is still enabled. The commutation signal interrupt instruction is input at specified timing based on detection signal 21 that is transmitted from axial position detector 3 of motor 14.

As shown in FIG. 14, first, the commutation signal interrupt processing determines whether or not the PWM signal is ON (at the high level) (step 301). In above step 301, if the PWM signal is determined to be ON, the PWM signal, i.e., only the PWM pulse in question, is turned OFF (to the low level) (step 302).

After that, the timer (not shown in the figure) is activated, and a standby state is effected until a pre-set amount of time passes (step 303). The time is a specified amount of time greater than or equal to $0.5\ T_g$. This ensures that the length of time when the PWM signal falls until the commutation signal rises, i.e., the time from the change point for the PWM signal to the change point for the commutation signal, is greater than or equal to $0.5\ T_g$. After that, the output of commutation signals is started, thus changing the commutation signals from the low level to the high level (step 304).

In step 305, the timer is activated, and a standby state is effected until a preset amount of time passes (step 305). The time is a specified amount of time greater than or equal to $0.5\ T_g$. This ensures that the length of time from when the commutation signal rises until the pulse following the PWM signal rises, i.e., the time from the change point for the commutation signal to the change point for the PWM signal, is greater than or equal to $0.5\ T_g$. Subsequently, the output of PWM signals is enabled (step 306).

In above step 301, if the PWM signal is determined to be OFF, the output of PWM signals is disabled (step 307). Then, commutation signals are output, namely, commutation signals are changed from the low level to the high level (step 308). After that, the timer is activated, and a standby state is effected until a preset amount of time passes (step 309). The time is a specified amount of time greater than or equal to $0.5\ T_g$. This ensures that the length of time when the commutation signal rises until the PWM signal rises, i.e., the time from the change point for the commutation signal to the change point for the PWM signal, is greater than or equal to $0.5\ T_g$. After that, the output of PWM signals is enabled (step 310).

After either above step 306 or 310, control returns to the main routine.

Thus, as embodiments 4 and 5, this embodiment sets a time difference at the change point for the PWM signal and at the change point for the commutation signal, and sets the change point for the commutation signal as the time when the PWM signal is turned off. In this manner, the embodiment can prevent large accidental switching surges and suppress switching surges. Moreover, because the timer-bases standby time (the commutation signal delay time, etc.) is set at greater than or equal to $0.5\ T_g$ and a time difference is set at greater than or equal to $0.5\ T_g$, the embodiment is capable of reliably suppressing switching surges.

In the case of a programmable arrangement, this embodiment allows appropriate modifications of the program. In this case, either the entire program or parts or it, such as time, can be modified.

Moreover, the omission of correction gate circuit 5 in this embodiment simplifies the circuit configuration. Although in this embodiment the standby time is set at greater than or equal to $0.5\ T_g$, it can be set at greater than or equal to $0.8\ T_g$ or even at greater than or equal to $T_g$ in order to enhance reliability.

Although in this embodiment the program is stored in memory that is built into the control means, for the purposes of the present invention the program can be stored in a magnetic recording medium, an optical recording medium, a magneto-optical recording medium, or other recording media; or on an IC memory card or other storage media.

Moreover, the motor control apparatus of the present invention is described in terms of the configuration examples shown in the figures, the present invention should not be construed as being limited to those examples. For example, for the purposes of the present invention the time difference between the change point for PWM signals and that for commutation signals can be set to be less than $0.5\ T_g$.

As described above, according to the motor control apparatus of the present invention, the provision of a correction means with the function of setting a time difference between the change point for PWM signals and the change point for commutation signals during motor operation prevents any large, accidental switching surges and can suppress switching surges.

Consequently, the voltage tolerance of power devices can be reduced and their switching speed can be increased. As a result, the efficiency of inverters can be increased. Thus, the present invention contributes to improvements in equipment performance and reliability.

The suppression of switching surges, moreover, helps to prevent electromagnetic interference and either eliminates or reduces the need for electromagnetic wave-shielding means.

While the invention has been described in conjunction with several specific embodiments; it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

| REFERENCE NUMERALS | |
| --- | --- |
| 1 | Gate drive circuit |
| 2 | PWM circuit |
| 3 | Motor axial position detector |
| 4 | Decoder circuit |
| 5 | Correction gate circuit |
| 6 | Logical AND circuit |
| 7–12 | Diodes |
| 13 | DC power supply |
| 14 | Motor |
| 15 | Positive pole bulk |
| 16 | Negative pole bulk |
| 17 | U phase |
| 18 | V phase |
| 19 | W phase |
| 20 | PWM signal |
| 21 | Detection signal |
| 22 | Commutation signal |
| 23 | Corrected PWM signal |
| 24 | Corrected commutation signal |
| 25–30 | Gate signals |
| 31 | PWM signal delay circuit |
| 32 | Commutation signal delay circuit |
| 33 | Delayed PWM signal |
| 34 | Prohibition gate circuit |
| 35 | Commutation signal delay circuit |
| 36 | Re-delayed signal |
| 37–41 | Change points |
| Tr1–Tr6 | Power devices |

What is claimed is:

1. A motor control apparatus that controls the operation of a motor by means of a pulse wave modulated control inverter having a PWM signal changing from one state to another state at a first change point and a commutation signal changing from one state to another state at a second change point, wherein the commutation signal is based on an axial position of the motor, comprising:

correction means for setting, during motor operation, a time difference of the PWM signal at the first change point and the commutation signal at the second change point.

2. The motor control apparatus of claim 1, wherein said correction means sets the commutation signal change point equal to a duration when the PWM signal is in an OFF state.

3. The motor control apparatus of claim 1 wherein said correction means corrects at least one of the PWM signal and the commutation signal.

4. The motor control apparatus of claims 1, wherein said correction means comprises a PWM signal delay circuit responsive to the PWM signal and a commutation signal delay circuit responsive to said PWM signal delay circuit for correcting the commutation signal.

5. The motor control apparatus of claim 4, wherein said commutation signal delay circuit delays the commutation signal based upon signals from said PWM signal delay circuit and outputs the corrected commutation signal.

6. The motor control apparatus of claim 1, wherein said correction means comprises a prohibition gate circuit for correcting the PWM signal, and a commutation signal delay circuit for correcting the commutation signal.

7. The motor control apparatus of claim 6, wherein said prohibition gate circuit disables, in accordance with the commutation signal and in accordance with the delayed commutation signal delayed by said commutation signal delay circuit, the PWM signal.

8. The motor control apparatus of claim 1, wherein said correction means comprises a prohibition gate circuit for correcting the of PWM signal, a first commutation signal delay circuit for delaying the commutation signal, and a second commutation signal delay circuit further delaying the commutation signal that are delayed by said first commutation signal delay circuit.

9. The motor control apparatus of claim 8, wherein said prohibition gate circuit, in accordance with the commutation signal delayed by said first commutation signal delay circuit, disables the PWM signal, and enables the PWM signals in accordance with said second commutation signal delay circuit.

10. The motor control apparatus of claim 1, wherein said correction means comprises a control means for executing a program that sets a time difference of the PWM signal at the first change point and commutation signal at the second change point during motor operation.

11. The motor control apparatus of claim 10, wherein said control means comprises a function of determining whether the PWM signal is in the one of the ON and OFF states and performs processing based on a result of the determination.

12. The motor control apparatus of claim 11, wherein said control means, when commutation signal is input, set the PWM signal to an OFF state if the PWM signal is in the ON state; and if the PWM signal is in the OFF state, enables the PWM signal after the output of the commutation signal is commenced.

13. The motor control apparatus of claim 1, in which said time difference is at least 0.5 $T_g$, wherein $T_g$ is defined as switching time of the power device of said PWM control inverter.

14. A method of controlling the operation of a motor by means of a pulse wave modulated control inverter having a PWM signal changing from one state to another state at a first change point and a commutation signal changing from one state to another state at a second change point, wherein the commutation signal is based on an axial position of the motor, comprising the step of:

setting, during motor operation, a time difference of the PWM signal at the first change point and the commutation signal at the second change point.

15. The method of claim 14, wherein said setting step comprises the step of setting the commutation signal change point equal to a duration when the PWM signal is in an OFF state.

16. The method of claim 14, wherein said setting step comprises the step of correcting at least one of the PWM signal and the commutation signal.

17. The method of claims 14, wherein said setting step comprises the steps of delaying the PWM signal and delaying the commutation signal for correcting the commutation signal.

18. The method of claim 14, wherein said setting step comprises the steps of prohibiting the PWM signal in response to the commutation signal and delaying the commutation signal for correcting the commutation signal.

19. The method of claim 18, wherein said prohibition step disables, in accordance with the commutation signal and the delayed commutation signal the PWM signal.

20. The method of claim 14, wherein said setting step comprises the steps of prohibiting the PWM signal, delaying the commutation signal, and further delaying the commutation.

21. The method of claim 20, wherein said setting step further comprises the step of, in accordance the commutation signal, disabling the PWM signal and enabling the PWM signals in accordance with the further delayed commutation.

22. The method of claim 14, wherein said setting step further comprises the step of executing a program that sets a time difference of the PWM signal at the first change point and commutation signal at the second change point during motor operation.

23. The method of claim 22, wherein said executing step comprises the steps of determining whether the PWM signal is in the one of the ON and OFF states and performing processing based on a result of the determination.

24. The method of claim 23, wherein said executing step further comprises the steps of, when commutation signal is input, setting the PWM signal to an OFF state if the PWM signal is in the ON state; and if the PWM signal is in the OFF state, enabling the PWM signal after the output of the commutation signal is commenced.

25. The method of claim 14, in which the time difference is at least 0.5 $T_g$, wherein $T_g$ is defined as switching time of the power device of the PWM control inverter.

26. A motor control apparatus for controlling a motor, comprising:

a commutation circuit for outputting a commutation signal based on an axial position of the motor, wherein the commutation signal comprises first and second states, wherein the commutation signal changes from the first state to the second state at a first change point;

a PWM circuit for generating a PWM signal, wherein the PWM signal comprises first and second states, wherein the PWM signal changes from the first state to the second state at a second change point;

a correction gate circuit for correcting a selected one of the commutation signal by setting a time difference of the commutation signal at the first change point and for outputting a corrected commutation signal, and the PWM signal by setting a time difference of the PWM signal at the second change point and for outputting a corrected PWM signal; and an inverter for supplying a drive signal to the motor in accordance the corrected commutation signal and the corrected PWM signal.

27. The control apparatus of claim 26, wherein said commutation circuit comprises:

a motor axial position detector for detection the axial position of the motor: and a decoder for decoding the axial position from said axial position detector.

28. The control apparatus of claim 26, wherein said correction gate circuit comprises a PWM signal delay circuit for delaying the PWM signal and a commutation signal delay circuit for delaying the commutation signal in accordance with the PWM signal delayed by said PWM signal delay circuit to output the corrected commutation signal, wherein the corrected PWM signal comprises the PWM signal.

29. The control apparatus of claim 26, wherein said correction gate circuit comprises:

a prohibition gate circuit for correcting the PWM signal in accordance with the commutation signal to output the corrected PWM signal; and a commutation signal delay circuit for delaying the commutation signal to output the corrected commutation signal.

30. The control apparatus of claim 26, wherein said correction gate circuit comprises:

a first commutation signal delay circuit for delaying the commutation signal to output the corrected commutation signal;

a second commutation signal delay circuit for delaying the corrected commutation signal to output a delayed corrected commutation signal; and a prohibition gate circuit for correcting the PWM signal in accordance with the commutation signal and the delayed corrected commutation signal from said second commutation signal delay circuit to output the corrected PWM signal.

31. A method of controlling a motor, comprising the steps of:

outputting a commutation signal in accordance with an axial position of the motor, wherein the commutation signal comprises first and second states, wherein the commutation signal changes from the first state to the second state at a first change point;

generating a PWM signal, wherein the PWM signal comprises first and second states, wherein the PWM signal changes from the first state to the second state at a second change point;

correcting a selected one of the commutation signal by setting a time difference of the commutation signal at the first change point and the PWM signal by setting a time difference of the PWM signal at the second change point, outputting a corrected commutation signal and a corrected PWM signal; and providing an inverter for supplying a drive signal to the motor in accordance the corrected commutation signal and the corrected PWM signal.

32. The method of claim 31 further comprising the steps of:

detecting the axial position of the motor; and decoding the axial position from detected axial position of the motor.

33. The method of claim 31, wherein said correction step comprises the steps of delaying the PWM signal and delaying the commutation signal in accordance with the delayed PWM signal to output the corrected commutation.

34. The method of claim 31, wherein said correction step comprises the steps of:

prohibiting the PWM signal in accordance with the commutation signal to output the corrected PWM signal; and for delaying the commutation signal to output the corrected commutation signal.

35. The method of claim 31, wherein said correction step comprises the steps of:

delaying the commutation signal to output the corrected commutation signal;

delaying the corrected commutation signal to output a delayed corrected commutation signal; and prohibiting the PWM signal in accordance with the commutation signal and the delayed corrected commutation signal to output the corrected PWM signal.

* * * * *

UNITED STATES PATENT AND TRADEMARK OFFICE
CERTIFICATE OF CORRECTION

PATENT NO.    : 5,703,768
DATED         : December 30, 1997
INVENTOR(S)   : Shigeo Kanna, et al.

It is certified that an error appears in the above identified patent and that said Letters Patent is hereby corrected as shown below:

Title page, item 73, Assignee, change "Seikon Epson Corporation" to --Seiko Epson Corporation--.

Signed and Sealed this

Ninth Day of November, 1999

Attest:

Q. TODD DICKINSON

*Attesting Officer*   *Acting Commissioner of Patents and Trademarks*